United States Patent
Xu et al.

(10) Patent No.: US 9,849,806 B1
(45) Date of Patent: Dec. 26, 2017

(54) CURRENT BASED SIX STEP CONTROL

(71) Applicant: FORD GLOBAL TECHNOLOGIES, LLC, Dearborn, MI (US)

(72) Inventors: Wei Xu, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/169,987

(22) Filed: Jun. 1, 2016

(51) Int. Cl.
*B60L 11/14* (2006.01)
*B60L 15/02* (2006.01)
*H02P 27/08* (2006.01)
*H02P 6/182* (2016.01)

(52) U.S. Cl.
CPC ............. *B60L 15/02* (2013.01); *H02P 6/182* (2013.01); *H02P 27/08* (2013.01); *B60L 2210/12* (2013.01); *B60L 2210/14* (2013.01); *B60L 2210/40* (2013.01); *B60L 2220/14* (2013.01); *B60L 2240/421* (2013.01); *B60L 2240/423* (2013.01); *B60L 2240/429* (2013.01); *B60L 2260/42* (2013.01)

(58) Field of Classification Search
CPC combination set(s) only.
See application file for complete search history.

(56) References Cited

U.S. PATENT DOCUMENTS

| | | | |
|---|---|---|---|
| 6,388,419 B1 | 5/2002 | Chen et al. | |
| 6,965,212 B1 * | 11/2005 | Wang | H02P 21/22 318/700 |
| 7,180,256 B2 * | 2/2007 | Eskritt | B62D 5/065 318/400.14 |
| 2008/0224649 A1 | 9/2008 | Bae et al. | |
| 2013/0249457 A1 | 9/2013 | Gallegos-Lopez et al. | |
| 2014/0070735 A1 | 3/2014 | Luedtke | |
| 2014/0070738 A1 | 3/2014 | Luedtke et al. | |
| 2015/0349679 A1 | 12/2015 | Rogers | |

OTHER PUBLICATIONS

Gyu H. Cho, and Song B. Park; Novel Six-Step and Twelve-Step Current-Source Inverters with DC Side Commutation and Energy Rebound; IEEE Transactions on Industry Applications, vol. IA-17, No. 5, Sep./Oct. 1981, 9 pages.

* cited by examiner

*Primary Examiner* — Edward J Pipala
(74) *Attorney, Agent, or Firm* — David B. Kelley; Brooks Kushman P.C.

(57) ABSTRACT

A vehicle powertrain includes a DC-DC converter and a controller. The DC-DC converter is coupled between a traction battery and an inverter for an electric machine. The controller is configured to, in response to a rotational speed of the electric machine dropping below a back EMF threshold speed, transition to a current control based six step inverter mode and operate the DC-DC converter to output a voltage less than an open circuit voltage of the traction battery.

20 Claims, 6 Drawing Sheets

CURRENT BASED SIX STEP CONTROL

TECHNICAL FIELD

This application is generally related to a hybrid vehicle powertrain controller utilizing six step control based on angle and voltage magnitude.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range. The terminal voltage of a typical traction battery is over 100 Volts DC, and the traction battery is alternatively referred to as a high-voltage battery. However, improved performance of electric machines may be achieved by operating in a different voltage range, typically at higher voltages than the traction battery.

Many electrified vehicles include a DC-DC converter also referred to as a variable voltage converter (VVC) to convert the voltage of the traction battery to an operational voltage level of the electric machine. The electric machine that may include a traction motor may require a high voltage and high current. Due to the voltage, current and switching requirements, an Insulated Gate Bipolar junction Transistor (IGBT) is typically used to generate the signals in the power inverter and the VVC.

SUMMARY

A vehicle powertrain includes a DC-DC converter and a controller. The DC-DC converter is coupled between a traction battery and an inverter for an electric machine. The controller is configured to, in response to a rotational speed of the electric machine dropping below a back EMF threshold speed, transition to a current control based six step inverter mode and operate the DC-DC converter to output a voltage less than an open circuit voltage of the traction battery.

A method of operating a vehicle powertrain includes receiving a torque request, and in response to a rotational speed of an electric machine dropping below a back electromotive force threshold speed, transitioning to a current control based six step inverter mode that is executed according to winding current direct and quadrature components of the electric machine, and the torque request, and operating a DC-DC converter to output a bus voltage to the electric machine less than an open circuit voltage of a traction battery.

A vehicle includes a DC-DC converter and a controller. The DC-DC converter is coupled between a traction battery and an inverter for an electric machine. The controller is configured to, in response to vehicle speed dropping below a threshold speed while a torque request is below a torque threshold, execute a six step control mode for the inverter according to winding current direct and quadrature components associated with the electric machine to drive the electric machine without back electromotive force feedback.

BRIEF DESCRIPTION OF THE DRAWINGS

FIG. 1 is a diagram of a hybrid vehicle illustrating typical drivetrain and energy storage components with a power inverter there between.

DETAILED DESCRIPTION

Figure 1:
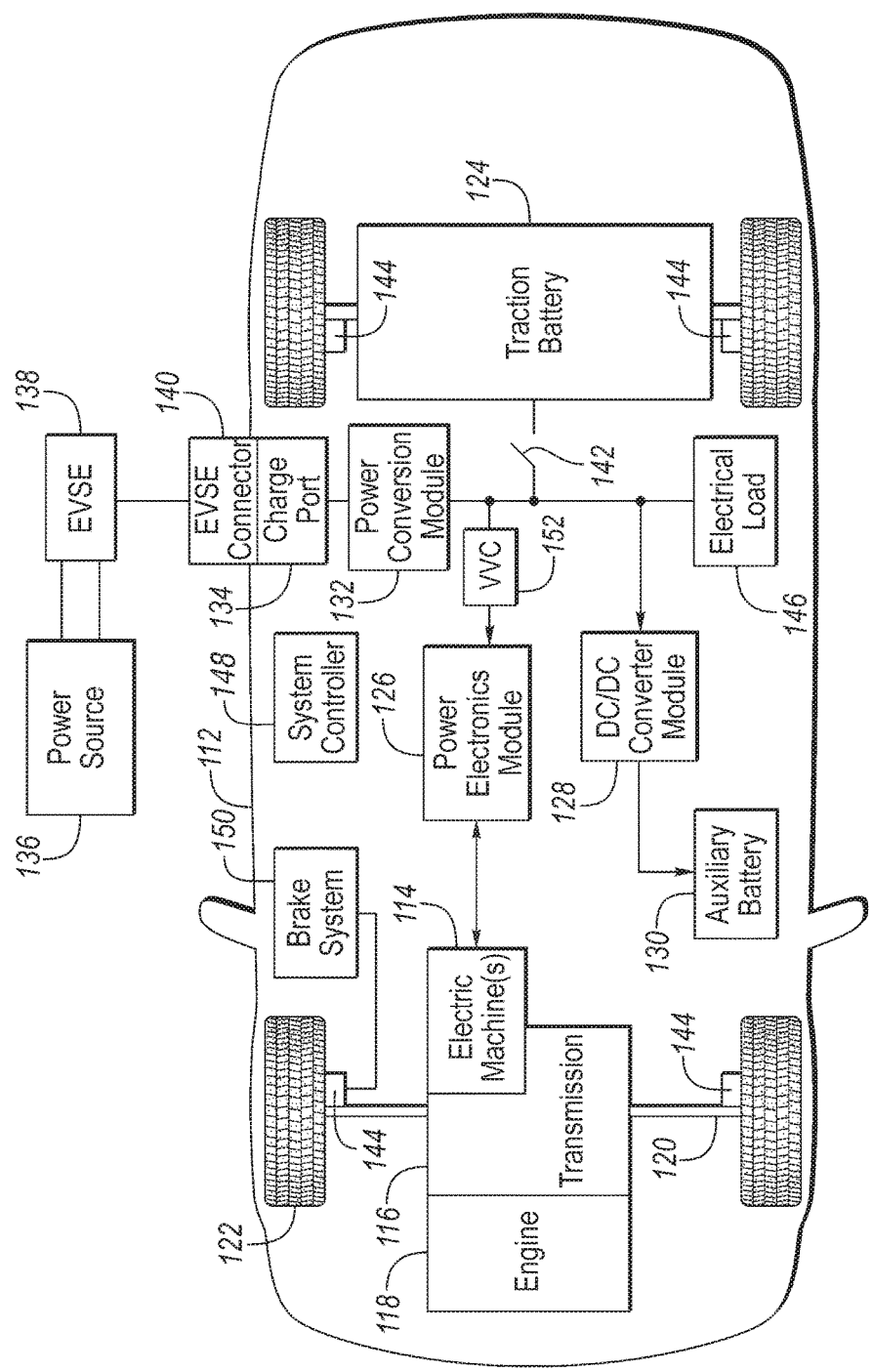

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An objective of the control of a hybrid electric vehicle powertrain may include improvements of the fuel economy during both city and highway driving. The objective for improved fuel economy may consider driving performance. A six step control method may be used to control an electric machine of the vehicle (e.g., traction motor, generator, or combination). Typically, six step control of an electric machine has a single degree of freedom, namely the voltage angle of the six step control. This single degree of freedom is typically performed in an open loop fashion without feedback. Here, feedback based on a calibration table of voltage angle and DC bus voltage may be included to 6-step control of an electric machine.

An electric machine may include a permanent magnet synchronous motor (PMSM) as PMSMs have generally favorable efficiency characteristics relative to other types of motors. Typically, PMSMs have three separate electrical windings within the stator which are each powered by alternating current (AC) voltages Va, Vb, and Vc. In operation, the winding currents Ia, Ib, and Ic each oscillate at a frequency proportional to the rotor speed and are separated by 120 degrees in phase from one another. These winding currents induce a rotating magnetic field which may be out of phase with the rotor. The resulting shaft torque depends upon both the magnitude of the magnetic field and the phase angle relative to the rotor. The magnetic properties of the permanent magnets are impacted by temperature which impacts the resulting torque. Accurate torque delivery requires compensation for the effects of temperature.

For convenience, the winding voltages and currents may be represented by vectors with respect to a rotating reference frame that rotates with the rotor. The mapping between rotor position and the rotating reference frame depends upon the number of poles and rotor position in the motor. The voltage vector has a direct component Vd and a quadrature component Vq in the rotor reference frame. Similarly, the current has a direct component Id and a quadrature component Iq. Vd, Vq, Id, and Iq do not oscillate based on rotor position.

In typical power-split hybrid electric drive configurations, DC to DC converter (e.g., a Variable Voltage Converter or VVC) is used to adjust the battery voltage to provide an operational voltage for the traction motor and/or generator. A VVC topology typically includes a half-bridge configured to boost a battery voltage to an operating voltage of the electric machine when in a propulsion mode and to flow, in a pass-through mode, power from the electric machine to the battery when in a regeneration or charging mode. The VVC may boost the battery voltage by operating two switching devices complementarily. The VVC operated in the pass-through mode includes maintaining the upper switching device is on while the lower switching device is off. In pass-through mode, the DC bus voltage is approximately the same as the battery voltage.

During operation of an electric machine powered at a low rotational speed, an induced electromagnetic field may typically be less than the battery voltage. The electric machine operating as a motor can operate at a required speed and torque via a DC bus voltage that is lower than the battery voltage. Losses associated with the switching device are normally lower while operating at lower DC bus voltages. Fuel economy of the entire electric drive system may be improved by bucking the battery voltage to a lower DC bus voltage needed to provide required torque and speed. The fuel economy may be further improved by operating the electric machine using a six step control mode instead of a pulse width modulation (PWM) mode. However, torque control using an open loop six step control mode is typically not as robust as motor control using PWM current control methods under external disturbance. Here, a current control based six step algorithm with a full bridge converter is shown to offer stable current control during six step operation.

A back electromotive force (EMF), also known as counter-EMF, is a force against a current of an Interior Permanent Magnet (IPM) motor that induces a voltage. Back EMF is detected by a change in voltage in an AC circuit caused by magnetic induction. An example of back EMF is the voltage change across an inductor due to an induced magnetic field inside the coil of a rotating IPM motor. Back EMF often refers to a voltage induced in an electric motor or electric machine caused by relative motion between an armature of the motor and the magnetic field from the motor's field magnets, or windings. The voltage is proportional to the magnetic field, length of wire in the armature, and the speed of the motor.

A rotating armature of an electric motor in the presence of a magnetic field will pass through the magnetic field as the armature rotates. The movement through the magnetic field produces a voltage in the coil. The voltage is opposite an applied voltage and is called "back EMF". Back EMF may be used to indirectly measure motor speed and position as the back EMF is generally proportional to a rotational speed of the armature. As the voltage is proportional to the rotational speed, when the rotation speed is high, the voltage is high and when the rotational speed is low, the voltage is low. As a result, if the rotational speed is very slow, the voltage becomes so small that the speed and position cannot be accurately determined. There is a point referred to as a back EMF threshold speed above which the rotational speed and position can be determined within a predefined tolerance, and below which the rotational speed and position cannot be determined within a predefined tolerance.

The full-bridge VVC may buck the battery voltage if the electric machine is operating at a low speed. Typically, most of the time during a city driving cycle, the electric machine rotates at a low speed. The losses of the switching devices are a function of a voltage across the device and a current through the device. Thus, switching losses may be reduced by reducing a DC bus voltage. Here, current control based six step method is proposed to replace the normal open loop six step for an electric machine operated at either a low DC bus voltage or a low rotational speed.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
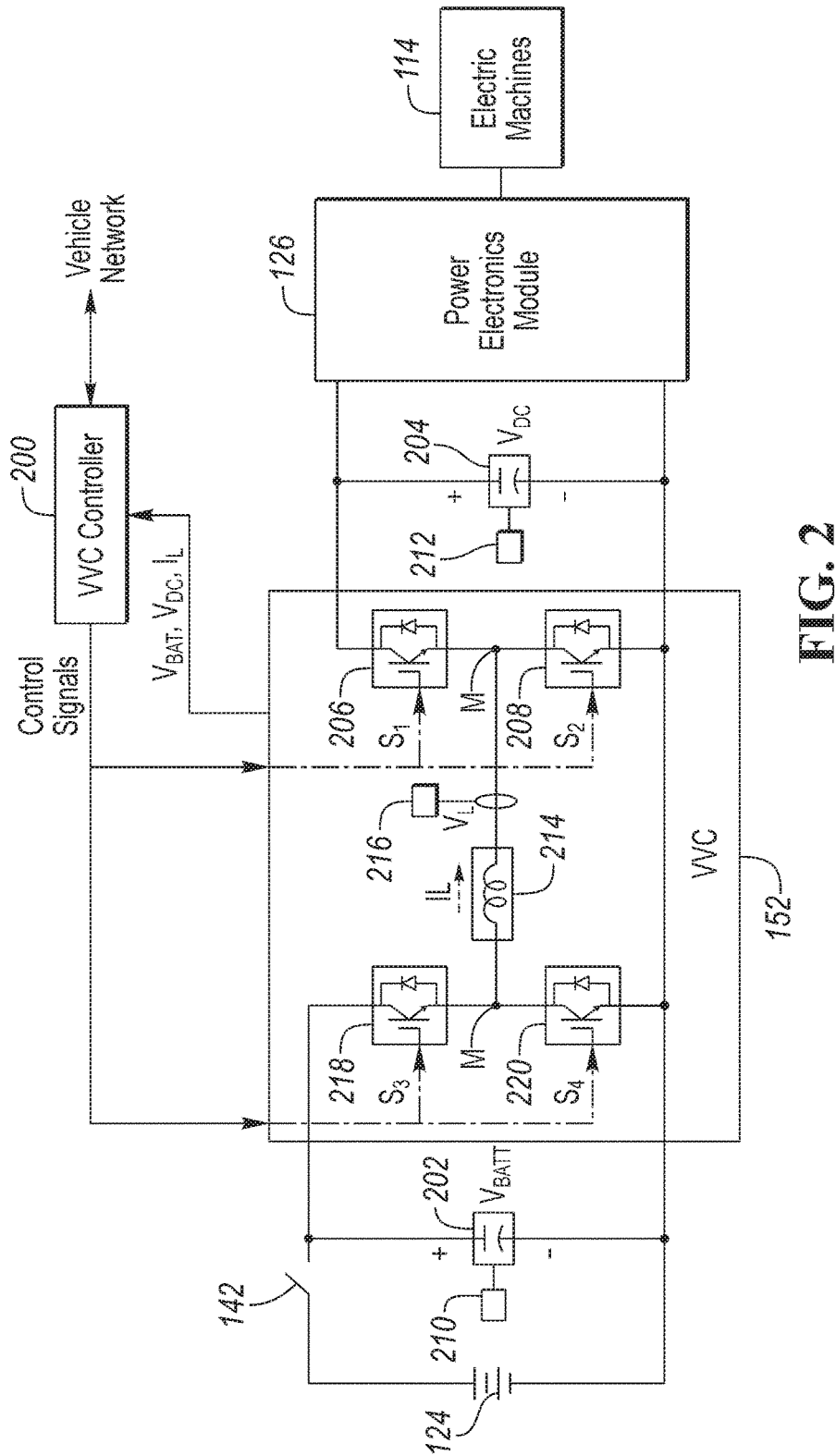
FIG. 2 is a schematic diagram of a vehicular variable voltage converter.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Also with reference to FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

Further with reference to FIG. 2, the VVC 152 may include a third switching device 218 and a fourth switching device 220 for bucking the input voltage to provide a lower output voltage at which the electric machine may operate at. This configuration also allows a lower generated voltage from the electric machine to be boosted to charge the battery. The switching devices 218, 220 may be configured to selectively flow a current to an electrical load (e.g., power electronics module 126 and electric machines 114). Each switching device 218, 220 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 218, 220 that are based on the control signal (e.g., duty cycle of PWM control signal). A diode may be coupled across each of the switching devices 218, 220. The switching devices 218, 220 may each have an associated switching loss. The switching losses are those power losses that occur during state changes of the switching device (e.g., on/off and off/on transitions). The switching losses may be quantified by the current flowing through and the voltage across the switching device 218, 220 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208).

Figure 4:
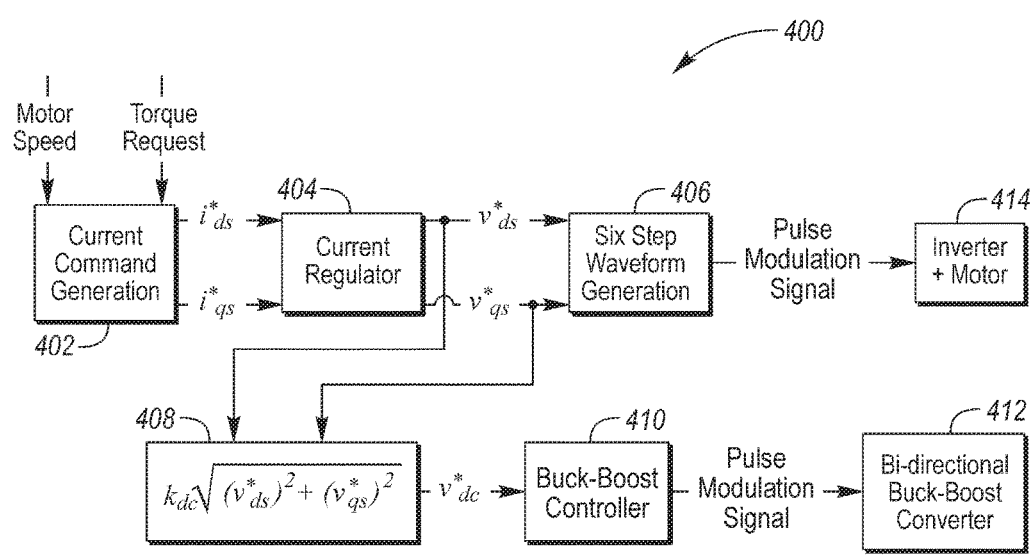
FIG. 4 is a flow diagram of a current controlled six step algorithm to drive a hybrid vehicle traction motor.
Figure 5:
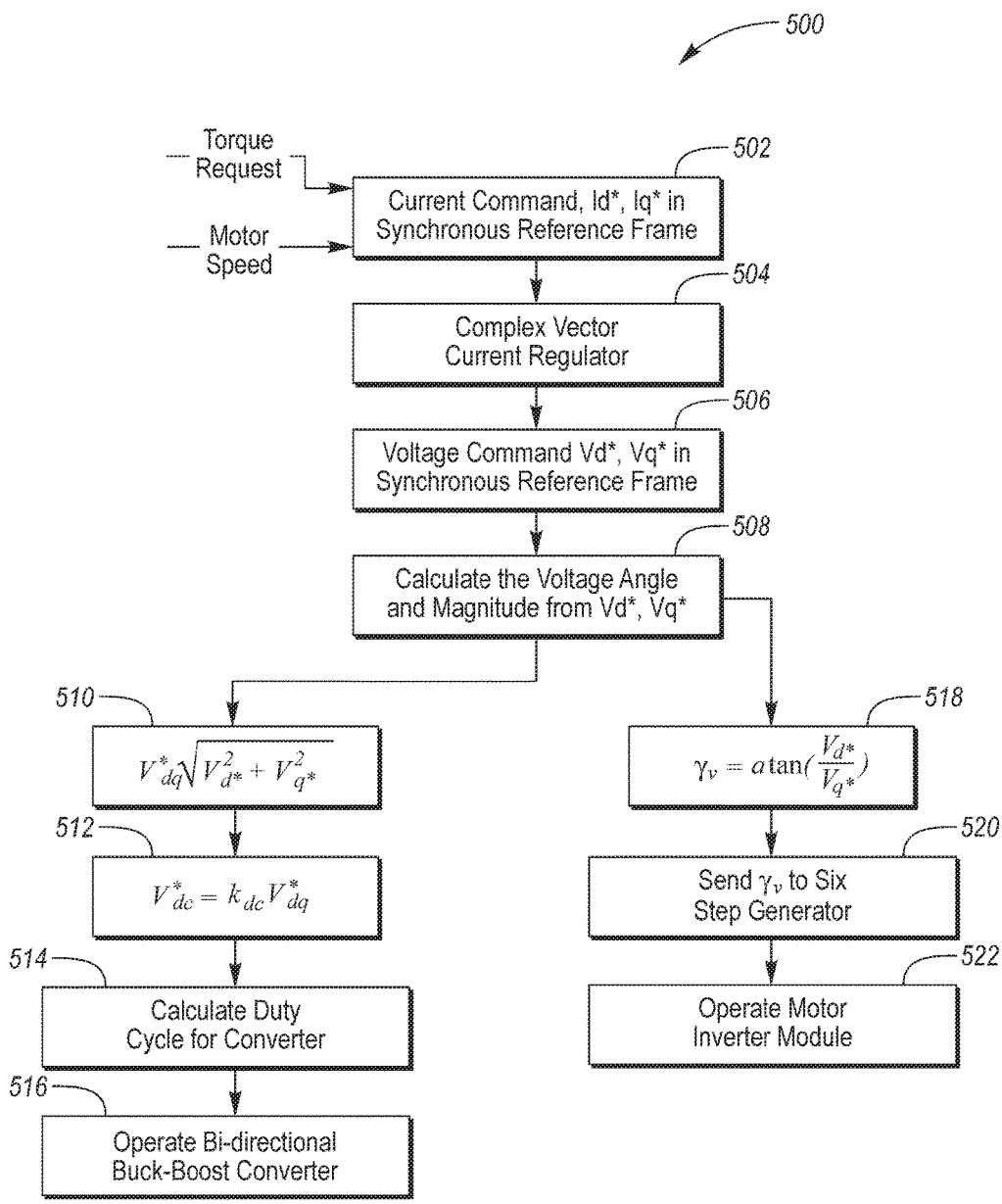
FIG. 5 is a flow diagram of a current controlled six step algorithm to drive a hybrid vehicle traction motor.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current as illustrated in FIG. 4. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the variable voltage converter 152. The switching frequency may also be based on parasitic inductance associated with the gate of the IGBT.

Figure 3:
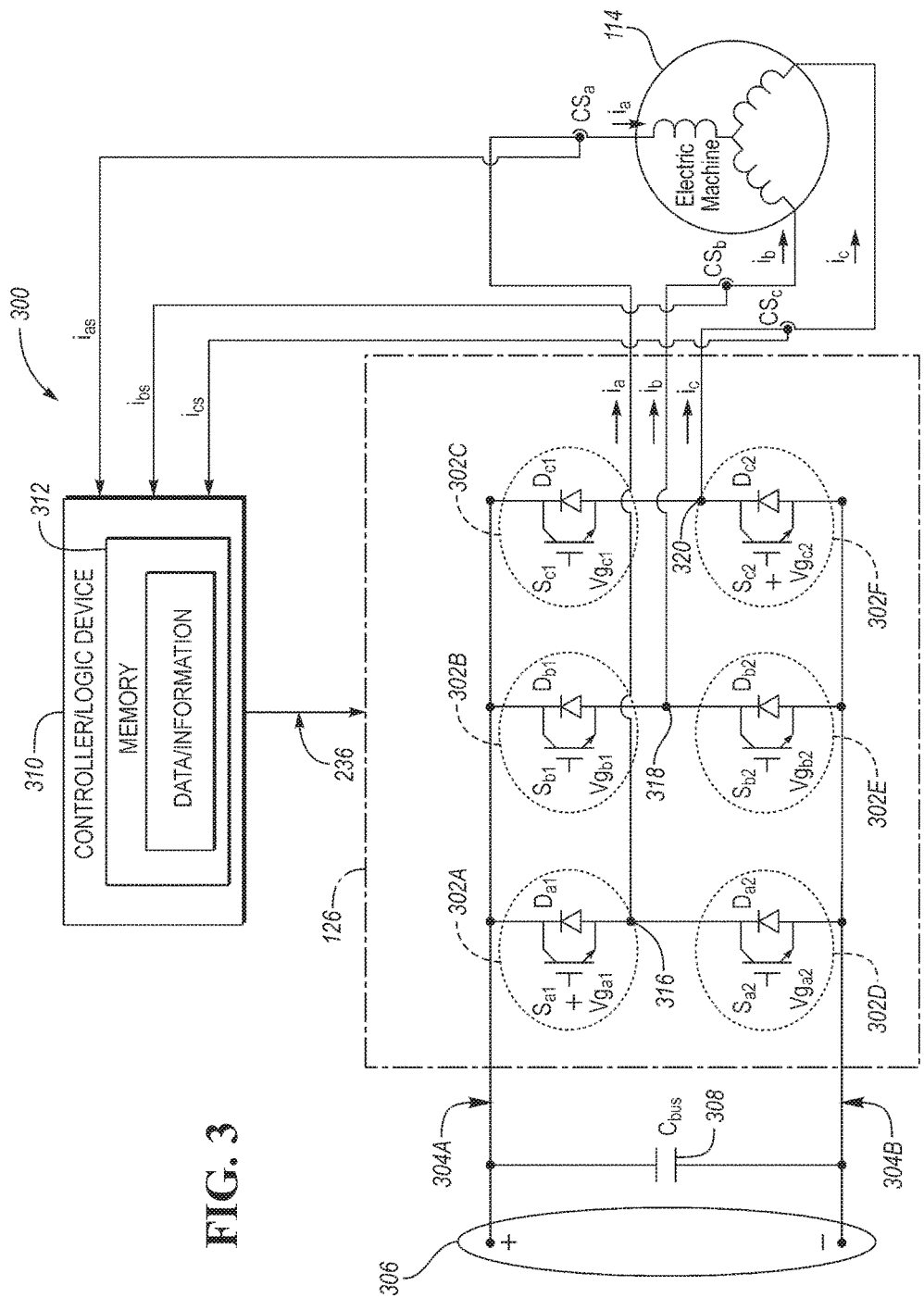
FIG. 3 is a schematic diagram of a vehicular electric motor inverter.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_a$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320.

Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

FIG. 4 is a flow diagram of a current controlled six step algorithm to drive an electric machine of a hybrid vehicle.

In operation 402, a controller generates a current command based on motor speed data and a torque request. The controller calculates current control data for motor control. The current control data is a mapping of torque requests and motor speeds to current commands (e.g., Id Iq).

In operation 404, the controller based on the current commands, generates a voltage command (Vds and Vqs). Here, feedback is used to maintain accuracy and robust control during both steady-state and transient operations. The feedback is based on 4 stator inputs, 2 stator current commands (Id/Iq) and 2 stator feedback current commands converted from current sensors and rotor position sensors are used. Here, the output is Vds* and Vqs* which are the voltage commands. Afterwhich, the controller continues to both operations 406 and 408 in parallel.

In operation 406, the controller generates a six step waveform. The six step waveform is typically generated open loop, with a voltage angle as the only input. In operation 414, the controller modulates the switches of the inverter in operation 414.

In operation 408, the controller, based on the voltage commands Vds* and Vqs* generates a coefficient Kdc to convert Vdq to Vdc while compensating for the voltage harmonics and AC to DC voltage magnitude conversion of the converter.

In operation 410, the controller converts the target DC voltage Vdc* to a series of pulse width modulated (PWM) signals.

In operation 412, the controller modulates the switches of the DC-DC converter according to the PWM signals from operation 410 to generate a DC bus voltage to operate the inverter/electric machine.

FIG. 5 is a flow diagram of a current controlled six step algorithm to drive an electric machine of a hybrid vehicle. In operation 502, a controller receives a torque request and a speed of an electric machine. The speed of the electric machine may be determined by measuring the back EMF induced by the windings as the rotor rotates with respect to the stator of the electric machine. The speed of the electric machine may also be determined by measuring pulses from a Hall Effect sensor coupled with the electric machine. In other embodiments, the speed of the electric machine may be determined by the use of an encoder and a resolver coupled with the electric machine. Further, the speed of the electric machine may be determined by measuring a speed of the vehicle while the electric machine is mechanically engaged with wheels of the vehicle. Based on the torque request and speed of the electric machine a current command for the direct component (Id) and a quadrature component (Iq) of the current flowing to the windings of the electric machine are determined.

In operation 504, the complex current controller regulates the motor current in the rotor reference frame. Transformation from the stationary to rotating reference frame produces a frame-dependent cross-coupling term, which results in degradation in current response at high speeds and is represented as asymmetric poles in the complex vector form of such systems. In other words, this cross-coupling term, acts as a disturbance, deteriorates current control-loop performance, and causes torque reduction at high speeds. Therefore, this frame-dependent cross-coupling term is problematic and should be decoupled. The idea of complex vector current regulator is to place the zero of the PI controller at the asymmetric pole in the complex vector domain, where the imaginary part has no parameters associated with it, and thus decouples the cross-coupling term. This approach is known to be less sensitive to parameter variation than the state-feedback cross-coupling decoupling In operation 506, the controller receives the complex vector current regulator data and determines a Voltage angle including a scalar for at specific torques and speeds and a voltage magnitude. Here, based on complex vector data, a voltage command for the direct component (Vd) and a quadrature component (Vq) of the voltage in the synchronous reference frame are calculated. Based on the direct component (Vd) and a quadrature component (Vq) of the voltage in the synchronous reference frame, the controller calculates a voltage angle and magnitude in operation 508. The voltage angle and magnitude is sent to operation 510 in which the controller calculates a $V_{dq}$*. In operation 512, the controller calculates the DC bus voltage ($V_{dc}$*) desired to be generated by the DC-DC converter. In operation 514, the controller calculates a duty cycle and mode of operation (e.g., boost, buck, or pass through). In operation 516, the controller operates the DC-DC converter in the mode of operation and at the duty cycle required to produce the output voltage (e.g., the DC bus voltage) that is provided to the inverter.

In operation 518, the six step angle generation is used to calculate the voltage angle to output the desired torque. For conventional Six-step operation, there is no control over the voltage magnitude. It is set by the Vdc bus voltage. In this case, some calibration procedure can be conducted to map the torque vs. voltage angle results for various speeds and bus voltages. For the proposed operation 518, since the DC bus voltage and voltage angle can be simultaneously adjusted to achieve the closed loop six step control for a desired torque command, the voltage angle can be directly calculated from the voltage command derived from complex current controller. The calculated voltage angle determines the commutation sequence of the three phase voltage. Every time when the addition of the rotor position and voltage angle reaches 0, 60, 120, 180, 240, 300 and 360 degrees, a pre-determined switching states will be applied to the inverter.

In operation 520 the controller generates the six step control signals based on the angle data from operation 518. In operation 522, the controller operates the inverter based on the current control six step mode. Operation 510, 512, 514, and 516 may be performed in series, in parallel, or a combination of both with operation 518, 520, and 522.

Figure 6:
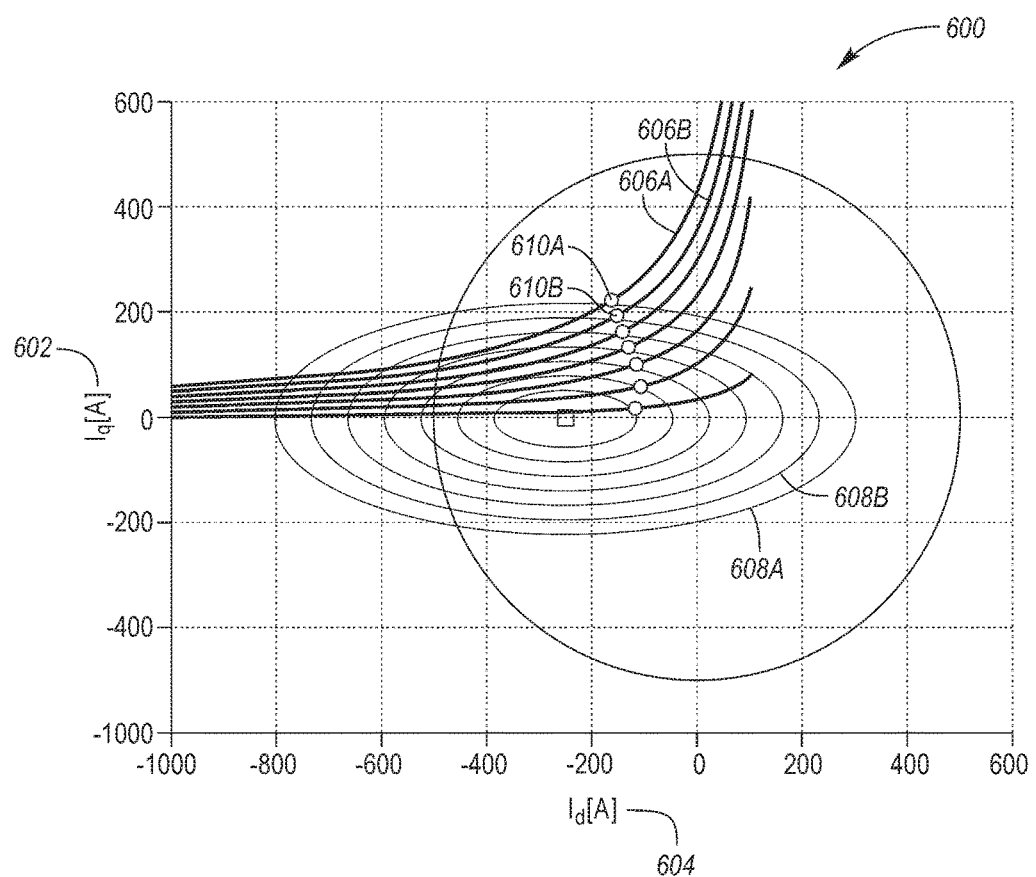
FIG. 6 is a graphical representation of DC bus voltage selection based on torque.

FIG. 6 is a graphical representation of DC bus voltage selection based on torque. This graphical representation is of an inverter-fed permanent magnet synchronous motors (PMSM) with respect to the winding current in the rotor reference frame. In this Figure, the quadrature component $I_q$ 602 is represented by the vertical axis and the direct component $I_d$ 604 is represented by the horizontal axis. Curves 606 represent different combinations of $I_d$ and $I_q$ that produce a particular output torque. Curve 606A represents a combination for a progressively higher output torque than curve 606B. Although every point along each curve 606 produces the same output torque, some combinations will be associated with higher losses than others. Points 610 form a line that represents the most efficient operating point for each level of torque. However, it is not always possible to operate the electric machine at these points. Points 610 represent the currents that are induced in the windings by the permanent magnets in the rotor as the rotor spins at a particular speed. When a voltage is applied by the inverter, the winding currents are altered from this condition. Curve 608B represents a boundary of the conditions that are achievable by the inverter at a particular rotor speed and bus voltage level. At higher bus voltages or lower rotor speeds, the boundary expands as shown by dashed curve 608A.

Here, the use of six step control to operate an electric machine such that a current vector operates on voltage ellipses 608 is illustrated. The DC bus voltage is selected based on the voltage command from the current controller. And, for different torque levels from the constant torque curves 606, different DC bus voltages from the voltage ellipses 608 are chosen to guarantee the required torque is delivered.

Here, a DC bus voltage selection and angle is derived from a current regulator and not from a calibration map. Constant torque curves 606 and voltage capability of the DC converter 608 are shown such that an intersection 610 indicates the DC bus voltage required for the desired torque. The largest circle is the highest DC bus voltage at a certain speed and the highest torque. A current limit is represented by circle 612 (e.g., 500 Amps).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
a DC-DC converter coupled between a traction battery and an inverter for an electric machine; and
a controller configured to, in response to a rotational speed of the electric machine dropping below a back EMF threshold speed, transition to a current control based six step inverter mode and operate the DC-DC converter to output a voltage less than an open circuit voltage of the traction battery.

2. The vehicle powertrain of claim 1, wherein the controller is further configured to operate the electric machine in a closed loop six step mode in response to the rotational speed of the electric machine being greater than the back EMF threshold speed, wherein a feedback position is based on back EMF of the electric machine.

3. The vehicle powertrain of claim 1, wherein the controller is further configured to operate the electric machine in a closed loop six step mode in response to the rotational speed of the electric machine being greater than the back EMF threshold speed, wherein a feedback position is based on a signal from a hall effect sensor coupled with the electric machine.

4. The vehicle powertrain of claim 1, wherein the current control based six step inverter mode is based on a field angle derived from a current command.

5. The vehicle powertrain of claim 1, wherein the electric machine is a synchronous motor.

6. The vehicle powertrain of claim 5, wherein the electric machine is a permanent magnet synchronous motor.

7. The vehicle powertrain of claim 1, wherein the controller is further configured to, in response to a torque request for the electric machine exceeding a limit, transition operation of the DC-DC converter from a buck mode to a boost mode to output a voltage greater than the open circuit voltage of the traction battery.

8. A method of operating a vehicle powertrain, the method comprising:
receiving a torque request; and in response to a rotational speed of an electric machine dropping below a back electromotive force threshold speed,
transitioning to a current control based six step inverter mode that is executed according to winding current direct and quadrature components of the electric machine, and the torque request, and
operating a DC-DC converter to output a bus voltage to the electric machine less than an open circuit voltage of a traction battery.

9. The method of claim 8 wherein the current control based six step inverter mode is based on a field angle derived from a current command.

10. The method of claim 9 wherein voltage is output at a level based on a rotor speed of the electric machine and a voltage command in a synchronous reference frame.

11. The method of claim 10 wherein the back electromotive force threshold speed is also based on the bus voltage.

12. The method of claim 8 wherein the direct and quadrature components are based on a rotor speed of the electric machine.

13. The method of claim 12 wherein the direct and quadrature components are also based on the bus voltage.

14. A vehicle comprising:
a DC-DC converter coupled between a traction battery and an inverter for an electric machine; and
a controller configured to, in response to vehicle speed dropping below a threshold speed while a torque request is below a torque threshold, execute a six step control mode for the inverter according to winding current direct and quadrature components associated with the electric machine to drive the electric machine without back electromotive force feedback.

15. The vehicle of claim 14, wherein the controller is further configured to operate the DC-DC converter to output a voltage to the inverter that is less than a voltage of the traction battery.

16. The vehicle of claim 14, wherein the controller is further configured to operate the electric machine in a closed loop six step mode in response to a speed of the vehicle being greater than the threshold speed, wherein a feedback position is based on back electromotive force of the electric machine.

17. The vehicle of claim 14, wherein the controller is further configured to operate the electric machine in a closed loop six step mode in response to the vehicle speed being greater than the threshold speed, wherein a feedback position is based on a signal from a Hall Effect sensor coupled with the electric machine.

18. The vehicle of claim 14 wherein the electric machine is a synchronous motor.

19. The vehicle of claim 18 wherein the electric machine is a permanent magnet synchronous motor.

20. The vehicle of claim 14, wherein the six step control mode is further based on a field angle derived from a current command.

* * * * *